United States Patent [19]

Song

[11] Patent Number: 5,519,505
[45] Date of Patent: May 21, 1996

[54] BYPASSING CIRCUIT FOR USE IN AN AUDIO SIGNAL RECORDING/REPRODUCING APPARATUS

[75] Inventor: Keon-Hwa Song, Seoul, Rep. of Korea

[73] Assignee: Daewoo Electronics Co., Ltd., Seoul, Rep. of Korea

[21] Appl. No.: 310,454

[22] Filed: Sep. 22, 1994

[30] Foreign Application Priority Data

Sep. 23, 1993 [KR] Rep. of Korea ............... 93-19452

[51] Int. Cl.$^6$ ............................................. H04N 5/76
[52] U.S. Cl. .................... 358/341; 358/343; 360/33.1; 360/65; 360/66; 348/736; 348/738
[58] Field of Search .............................. 358/341, 343, 358/335, 340; 360/33.1, 55, 65, 66; 348/607, 618, 738, 736, 737, 729; 333/18, 28 R, 28 T; 381/94, 98, 101; H04N 5/76, 5/911

[56] References Cited

U.S. PATENT DOCUMENTS

| 4,323,915 | 4/1982 | Cezar et al. ............... 358/319 |
| 5,278,700 | 1/1994 | Sutliff et al. ............... 360/65 |
| 5,327,297 | 7/1994 | Enami et al. ............... 360/66 |

*Primary Examiner*—Tommy P. Chin
*Assistant Examiner*—Khoi Truong
*Attorney, Agent, or Firm*—Anderson Kill Olick & Oshinsky

[57] ABSTRACT

An improved audio recording/reproducing apparatus reduces noises in the reproduced audio signal by employing a bypassing circuit which includes a transistor having a low internal resistance.

2 Claims, 1 Drawing Sheet

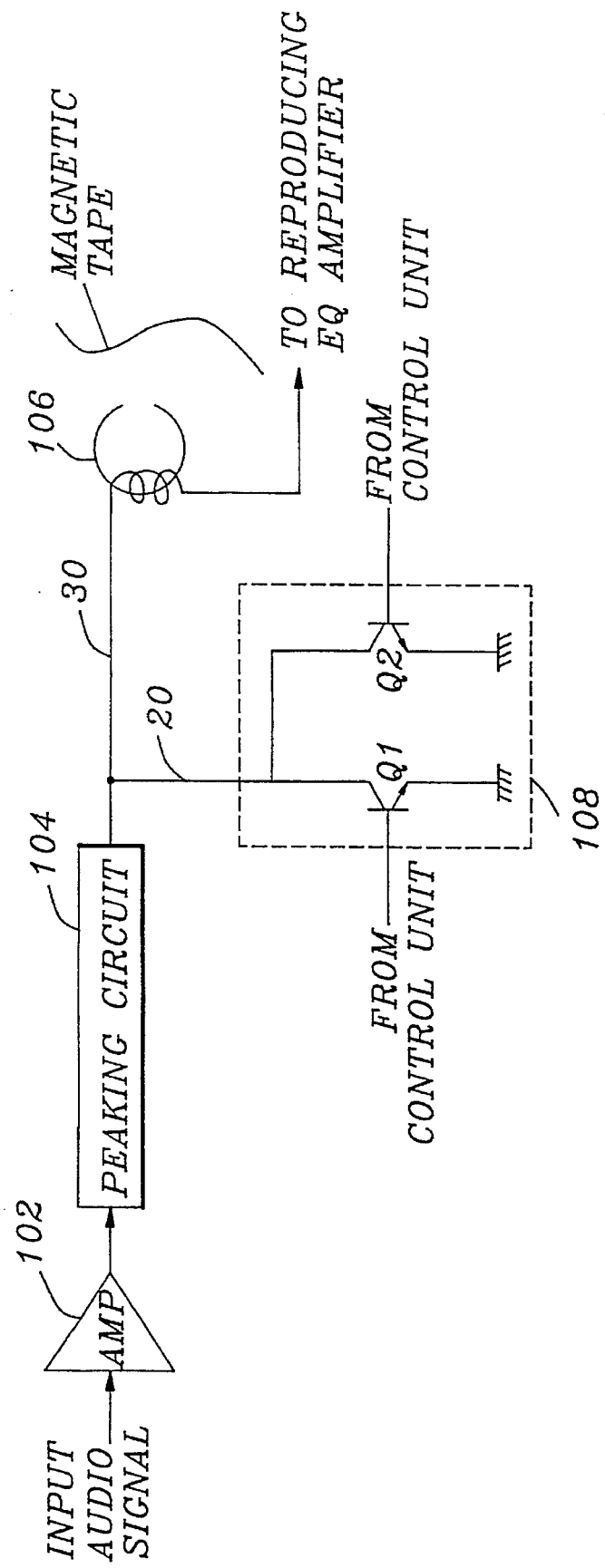

BYPASSING CIRCUIT FOR USE IN AN AUDIO SIGNAL RECORDING/REPRODUCING APPARATUS

FIELD OF THE INVENTION

The present invention relates to an audio signal recording/reproducing apparatus for use in a video cassette recorder;and, more particularly, to an improved audio signal recording/reproducing apparatus capable of reducing noises during the reproduction of an audio signal.

DESCRIPTION OF THE PRIOR ART

As well known, audio signal recording/reproducing apparatus is used in a conventional video cassette recorder ("VCR") to record and reproduce audio signals by means of a recording/reproducing audio head which is in contact with a magnetic tape inserted in the VCR.

For recording an audio signal from, e.g, an external audio source, the input audio signal is amplified at a recording amplifier and then provided to a peaking circuit for generating an emphasized audio signal by boosting the high frequency components of the input audio signal. Thereafter, the emphasized audio signal from the peaking circuit is applied to the recording/reproducing audio head for the recording thereof on the magnetic tape.

Conversely, when a recorded audio signal is reproduced from the magnetic tape by using the recording/reproducing audio head, the reproduced audio signal is supplied to a reproducing equalization("EQ") amplifier for amplifying the reproduced audio signal. At this time, the emphasized audio signal from the peaking circuit should be blocked in order to prevent it from going to the reproducing EQ amplifier. Accordingly, a conventional audio signal recording/reproducing apparatus employs a bypassing circuit, which is coupled to a line connecting the peaking circuit and the recording/reproducing audio head, and is used to bypass the emphasized audio signal to ground under the control of a control unit, thereby blocking the emphasized audio signal from the peaking circuit. The bypassing circuit usually comprises a transistor, which is fabricated as a part of an integrated circuit ("IC"), e.g., 7790LS or LA7280 available from ROHM Co., Ltd., or SANYO Co., Ltd.

However, due to the high integration density of the audio IC, the transistor has a higher internal resistance than a regular transistor. Accordingly, because of the high internal resistance, a portion of the emphasized audio signal is supplied to the reproducing EQ amplifier, without fully bypassing it to ground, and then amplified along with the reproduced audio signal, thereby generating such noises as humming or buzz sounds in the reproduced audio signal.

SUMMARY OF THE INVENTION

It is, therefore, an primary object of the invention to provide an improved audio signal recording/reproducing apparatus for use in a VCR capable of effectively reducing noises in a reproduced audio signal.

In accordance with the present invention, there is provided an improved audio recording/reproducing apparatus, for use in a VCR, having a peaking circuit for generating an emphasized audio signal by boosting high frequency components of an input audio signal, a recording/reproducing audio head for recording the emphasized audio signal and reproducing a recorded audio signal, and a bypassing circuit, coupled to a line connecting the peaking circuit and the recording/reproducing head, for bypassing the emphasized audio signal in reproducing the recorded audio signal under the control of a control unit, wherein the bypassing circuit comprising a first transistor having a fixed internal resistance, whose collector is coupled to the line with its base connected to the control unit and its emitter connected to ground, and a second transistor having a lower internal resistance than the first transistor, whose collector is connected to the collector of the first transistor with its a base connected to the control unit and its emitter connected to ground.

BRIEF DESCRIPTION OF THE DRAWING

The above and other objects and features of the present invention will become apparent from the following description given with reference to the accompanying drawing, which shows a circuit diagram of a preferred embodiment of the novel audio signal recording/reproducing apparatus.

DETAILED DESCRIPTION OF THE PREFERRED EMBODIMENT

Referring to the drawing, there is shown an improved audio signal recording/reproducing apparatus for use in a VCR in accordance with the present invention. The audio signal recording/reproducing apparatus, as shown, comprises a recording amplifier 102, a peaking circuit 104, a recording/reproducing audio head 106 and a bypassing circuit 108 which includes a first transistor Q1 and a second transistor Q2 coupled in parallel. The operation of the inventive audio signal recording/reproducing apparatus will now be described.

For recording an input audio signal, the two transistors Q1 and Q2 in the bypassing circuit 108 are turned off in response to a control signal, e.g, a logic low signal from a control unit(not shown). The input audio signal generated from an audio source(not shown) is provided to the recording amplifier 102, which amplifies the input audio signal to transmit an amplified audio signal to the peaking circuit 104. The peaking circuit 104 generates an emphasized audio signal by boosting high frequency components of the amplified audio signal and outputs the emphasized audio signal to the recording/reproducing audio head 106. The recording/reproducing audio head records the emphasized audio signal on a magnetic tape inserted in the VCR.

On the other hand, for reproducing a recorded audio signal from the magnetic tape, the recorded audio signal is picked up by the recording/reproducing audio head 106, which is in contact with the tape, and provided to the reproducing EQ amplifier, which performs the amplification of the reproduced audio signal. At the same time, the two transistors Q1 and Q2 in the bypassing circuit 108 are turned on in response to a control signal, e.g, a logic high signal, from the control unit in order to effectively bypass the emphasized audio signal generated from the peaking circuit 104 through a line 20.

As disclosed above, the first transistor Q1, which is integrated in an audio IC, in the bypassing circuit 108 has a higher internal resistance than the second transistor Q2, e.g, ranging from 11Ω to 20Ω and has a collector coupled to a line 30 connecting the peaking circuit 104 and the recording/reproducing audio head 106, a base controlled by the control signal from the control unit and an emitter connected to ground. The second transistor Q2, whose internal resistance ranges from 3Ω to 10Ω, has a collector coupled to the collector of the first transistor Q1, a base controlled by the control signal from the control unit, and an emitter connected to ground. The parallel combination of the two transistors Q1 and Q2 reduces the total internal resistance of the bypassing circuit 108. For instance, in case the first and the second transistors Q1 and Q2 have the internal resistances of 20Ω and 5Ω, respectively, the total internal resistance will be reduced to 4Ω. Accordingly, the emphasized audio signal on line 30 is effectively bypassed through both transistors Q1 and Q2 without it being supplied to the reproducing EQ amplifier; and, consequently, the audio recording/reproducing apparatus can effectively remove or alleviate noises in the reproduced audio signal.

While the present invention has been shown and described with reference to the particular embodiment, it will be apparent to those skilled in the art that many changes and modifications may be made without departing from the spirit and scope of the invention as defined in the appended claims.

What is claimed is:

1. An audio signal recording/reproducing apparatus having a peaking circuit for generating an emphasized audio signal by boosting high frequency components of an input audio signal, a recording/reproducing audio head for recording the emphasized audio signal and reproducing a recorded audio signal, and a bypassing circuit, coupled to a line connecting the peaking circuit and the recording/reproducing head, for bypassing the emphasized audio signal in reproducing the recorded audio signal under the control of a control unit, wherein the bypassing circuit comprises:

a first transistor having a fixed internal resistance, whose collector is coupled to said line with its base connected to the control unit and its emitter connected to ground; and a second transistor having a lower internal resistance than the first transistor, whose collector is connected to the collector of the first transistor with its base connected to the control unit and its emitter connected to ground.

2. A video cassette recorder comprising the audio recording/reproducing apparatus of claim 1.

* * * * *